United States Patent
McGinnis et al.

[15] 3,690,465
[45] Sept. 12, 1972

[54] PERMEATION SEPARATION ELEMENT

[72] Inventors: Philip Roswell McGinnis; Gerald Joseph O'Brien, both of Newark, Del.

[73] Assignee: E. I. du Pont de Nemours and Company, Wilmington, Del.

[22] Filed: Oct. 15, 1970

[21] Appl. No.: 81,060

[52] U.S. Cl. .................. 210/321, 210/494, 210/500
[51] Int. Cl. .............................................. B01d 31/00
[58] Field of Search .......... 264/41, 49, 258, 177, 277, 264/279, 200; 210/22, 494, 23, 321, 500; 55/16, 158

[56] References Cited

UNITED STATES PATENTS

| | | | |
|---|---|---|---|
| 3,554,378 | 1/1971 | Kohl | 210/494 X |
| 3,401,798 | 9/1968 | Hyrop | 210/494 X |
| 3,422,008 | 1/1969 | McLain | 210/23 X |
| 3,526,001 | 8/1970 | Smith | 210/321 X |
| 3,536,611 | 10/1970 | De Filippi et al. | 210/22 |
| 3,557,962 | 1/1971 | Kohl | 210/500 X |
| 3,579,810 | 5/1971 | Mon | 264/277 |

*Primary Examiner*—Frank A. Spear, Jr.
*Attorney*—John R. Powell

[57] ABSTRACT

An improved element for the selective permeation separation of components of fluid mixtures comprises (1) thin layers of substantially parallel hollow filaments separated by (2) thin foraminous materials which restrict movement and prevent nesting of the hollow filaments during use of the element, and (3) a resinous tube sheet structure encapsulating a portion of the hollow filaments, with open ends of the filaments extending through the tube sheet structure. A permeation separation device incorporates the improved element in a surrounding shell with means for introducing into and removing a fluid mixture from the shell and means for removing separated components of the mixture from the open ends of the hollow filament membranes. Preferably the device also contains a foraminous tube in the center with the foraminous material and hollow filaments convolutely wrapped around the tube. Such devices are particularly useful for the reverse osmosis desalination of water.

7 Claims, 14 Drawing Figures

INVENTORS
PHILIP ROSWELL McGINNIS
GERALD JOSEPH O'BRIEN

BY John R. Powell
ATTORNEY

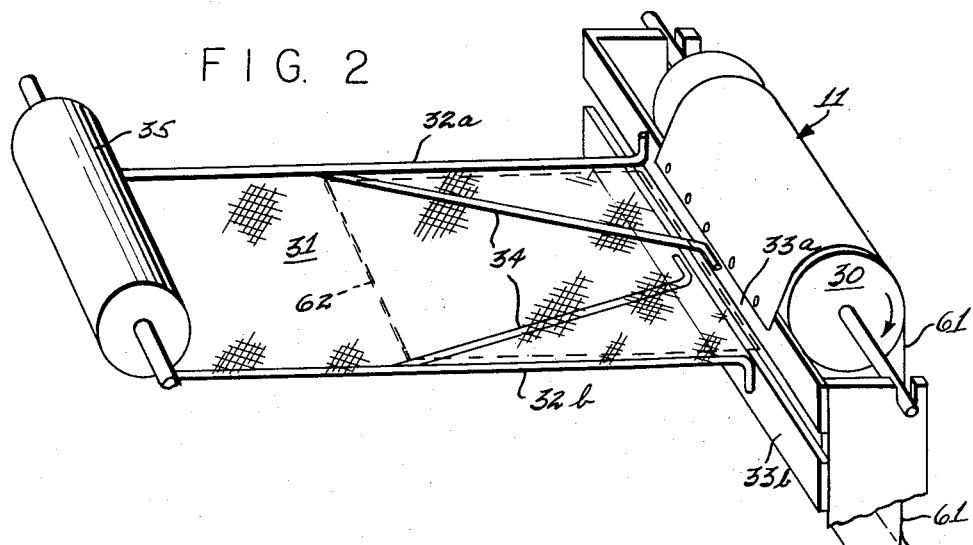
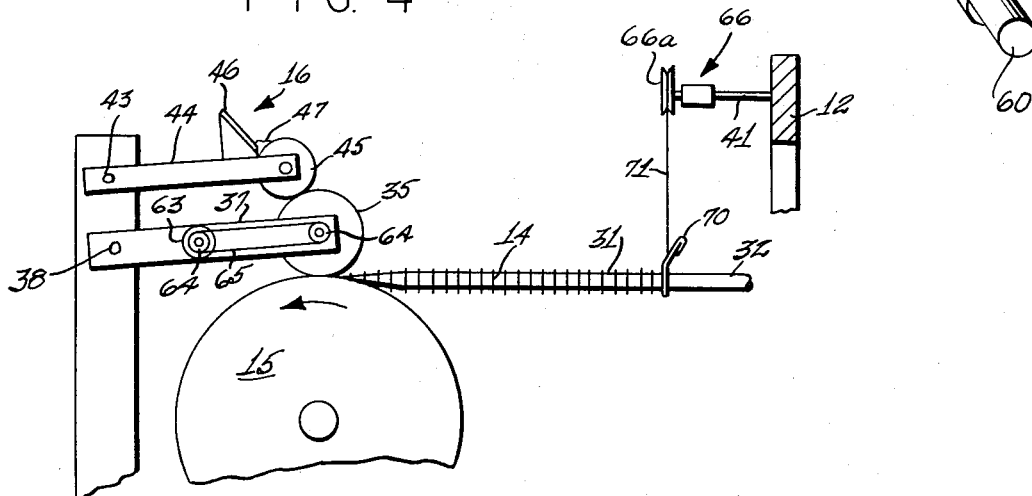
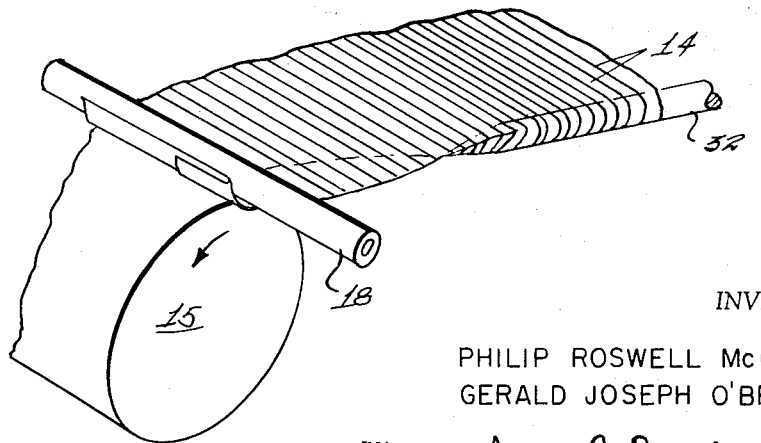
INVENTORS
PHILIP ROSWELL McGINNIS
GERALD JOSEPH O'BRIEN
BY John R. Powell
ATTORNEY

PATENTED SEP 12 1972

INVENTORS
PHILIP ROSWELL McGINNIS
GERALD JOSEPH O'BRIEN

BY John R. Powell

ATTORNEY

INVENTORS
PHILIP ROSWELL McGINNIS
GERALD JOSEPH O'BRIEN

BY John R. Powell
ATTORNEY

INVENTORS
PHILIP ROSWELL McGINNIS
GERALD JOSEPH O'BRIEN

John R. Powell
ATTORNEY

3,690,465

PERMEATION SEPARATION ELEMENT

BACKGROUND OF THE INVENTION

1. Field of the Invention

This invention relates to an improved device for the selective permeation separation of components from fluid mixtures or solutions. More particularly, it is directed to an improved permeation separation element in which layers of small hollow filaments are separated by a foraminous material, and to a device incorporating this element.

2. Description of the Prior Art

Hollow tube membranes have long been recognized as useful in the selective permeation separation and purification of components of fluid mixtures. In a typical process, a fluid mixture is brought into contact with one surface of a membrane and one or more components passes through the membrane because of a difference in concentration, which may be due to a difference in pressure. The mixture is separated into portions enriched in and depleted in those components of the mixture which are selectively permeable in the membrane. Various apparatus and device forms have been developed for the practical operation of such processes. A frequently used form is similar to a tube-and-shell heat exchanger, with parallel tubular membranes inside a shell and opening through tube sheet structures into at least one head space, with means for introducing and removing fluid mixtures into and from the shell space and head spaces. Thus, Lavender et al. disclose in U.S. Pat. No. 3,522,885 a parallel flow hemodialyzer apparatus including large parallel cellophane tubes sealed into tube-sheets inside a shell in combination with supporting and separating layers of non-woven mesh material which prevent contact between the tubular membranes and provide passages for efficient flow of dialysate fluid across and along the lengths of the tubular membranes and with inserts or shims inside the membranes which improve the efficiency of contact of blood with the inner surfaces of the membranes.

Small hollow filaments of selectively permeable polymeric composition and suitable structure are also known to be useful membranes in such separation devices. Effective contact between such hollow filament membranes and the fluid mixture being separated is equally and similarly important for the efficient operation of such devices. Various arrangements have been proposed for hollow filament membrane devices with different degrees of economy and efficiency of assembly and operation.

Thus Mahon describes in U.S. Pat. No. 3,228,877 a device in which separate small unsupported bundles of hollow filament membranes extend through a shell space between tube sheet structures. Such a device contains a relatively small membrane area in the used shell volume and is relatively inefficient in operation because of the small difference in composition of the fluid mixtures introduced into and removed from the shell space. Maxwell et al. describe in U.S. Pat. No. 3,339,341 another device in which one or more bundles enclosed in flexible sheaths and containing large areas of hollow filament membranes are tightly packed inside a shell to provide more efficient flow of a fluid mixture along the lengths of the filaments. Tomsic reports in U.S. Pat. No. 3,503,515 that the efficiency of contact between the membrane surfaces and the mixture being separated can be further improved in such a device by introducing inert particulate matter into the spaces between the hollow filaments.

Smith describes in U.S. Pat. No. 3,526,001 another device in which the flow of the mixture to be separated is radially across instead of axially along hollow filament membranes. This device incorporates a perforated tube in the center of a large bundle of hollow filaments and an annular space between the bundle and a shell, with means for introducing and removing a fluid mixture into and from the perforated tube and the annular space and for removing permeated material from the open ends of the hollow filament membranes. The perforations in the tube are sized and located to promote flow of the mixture being separated radially and uniformly across all equivalent portions of the bundle so as to promote efficient contact of the mixture with all membrane surfaces throughout the bundle.

The device described by Smith represents a significant advance over previous devices and initially provides quite efficient contact between hollow filament surfaces and the mixtures to be separated. However, it has been found to become less efficient during use. Even when the hollow filament bundles are tightly restrained and inside a larger shell to assure the presence of the annular space, and banded to promote equivalent radial flow of the mixture being separated through all portions along the length of the bundle, still flow of the mixture through the bundle results in migration of the filaments toward more stable nested arrangements which are less open to fluid flow. Such motion and nesting of the filaments results in zones within the bundle in which fluid flow is restricted until increased pressure drop results. The rate of flow through such zones under a constant available pressure is therefore reduced. When flow through any zone within the bundle becomes significantly reduced, continued passage of more permeable components from the fluid mixture through the membranes in this zone results in increased concentration of the less permeable components and correspondingly increased passage of these less permeable components through the membranes. The efficiency of the separation obtained with the device is thereby reduced. In extreme instances, less permeable components can be precipitated from saturated solutions and further reduce flow and separation efficiency.

It has also been found that the restriction of flow caused by movement and nesting of hollow filaments increases in significance during continued operation of the device. Apparently, the restriction of flow in a first zone results in increased flow rates in other equivalent second zones and the increased flow rates increase the rate and magnitude of movement of hollow filaments in these second zones and cause similar nesting of the filaments in these zones in increasing rate and severity. Eventually flow can become so restricted in a group of similar zones that the increased pressure required and lowered efficiency make it impractical to maintain a desired flow rate through and productivity from the device. Moreover, if the restriction in flow occurs in the zones into which the mixture to be separated is first introduced, the reduced pressure in other zones further reduces the productivity of the device.

Various techniques have been used in prior art hollow filament membrane permeation separation devices to restrict movement of the filaments and determine the paths of flow of the mixture separated. Thus, Strand describes in U.S. Pat. No. 3,342,729 a device comprising a relatively flat meshlike structure of woven or interlaced hollow filament membranes sealed on all edges into a frame with the open ends of the filaments terminating in openings in the frame, means for passing a fluid mixture through the flat meshlike structure, and means for collecting components of the mixture which permeate through the membranes from the open ends of the hollow filaments. The filaments in such a device are relatively fixed in place because they are woven together or interlaced. Such a device is complicated, expensive, and inefficient because of the required thickness of the frames and the resulting small membrane area which can be installed in a device of a given volume. McLain describes in U.S. Pat. No. 3,422,008 another device in which hollow filament membranes are wound spirally under tension around a cylindrical core in layers alternating in direction so that the filaments in adjacent layers are in a crisscross configuration. During formation of the alternating layers, a suitable setting resin is applied near at least one of the looped ends of the structure. Setting of this resin and cutting through it and the filament loops it encloses opens the filaments to fluid flow. The filaments are relatively fixed in position by the tensioned alternate layers. The pairs of adjacent layers contain openings through which material to be separated can flow in predetermined paths. Choice of winding conditions can assure that the openings in successive pairs of layers are uniform in size and in proper alignment to assure uniform flow of the mixture to be separated through the assembly and across the filaments. Such a device is limited in size because of difficulty in constructing stable large-diameter windings of filaments around a cylindrical core. Also, the membrane area which can be assembled in a given volume is limited by the fraction of the wound volume which is occupied by the hollow filaments.

Thus a need still exists for a selective permeation separation device which can be economically and efficiently assembled and used for long periods of time without marked change in separation efficiency due to migration and nesting of filament membranes.

It is the object of this invention to provide improved selective permeation separation elements and devices in which movement and nesting of hollow filament membranes are materially reduced with an attendant increase in separation efficiency due to the efficient contact between the fluid mixture and the hollow filament surfaces.

SUMMARY OF THE INVENTION

In summary this invention is directed to an improved permeation separatory element comprising
a multiplicity of hollow filaments of a polymeric material in at least two discrete thin layers, in substantially parallel alignment in a given layer, each filament having an outside diameter between about 10 and 250 microns, a wall thickness between about 2 and 75 microns and an open end;
a thin foraminous material separating the layers of filaments; and
a resinous tube sheet structure of relatively short thickness in comparison with the length of the filaments and in a fluid tight relationship with the filaments, each open end of the filaments extending through a tube sheet structure.

The separatory element can be arranged such that the filaments are substantially perpendicular to a tube sheet structure and the element can be surrounded by a vessel in fluid tight relationship with a tube sheet structure and with separate conduit means to permit movement of fluid from outside the vessel to an area adjoining the interior walls of the vessel, to a foraminous tube situated within the element, the layers of filaments being wound around the tube, and to an area adjacent to a face of a tube sheet structure.

A preferred embodiment of this invention is a permeation separatory element prepared as shown in FIG. 1, such that two layers of filaments are adjacent to each side of the foraminous web-like material which is present between four layers of filament.

DESCRIPTION OF THE DRAWINGS

FIG. 2 is an isometric view of a portion of the apparatus of FIG. 1, showing a web feeder and web guide.

FIG. 4 is an elevational view of part of the apparatus of FIG. 1, showing a resin applicator in greater detail.

FIG. 5 is a fragmentary isometric view of a web guide showing the web in a folded condition.

DESCRIPTION OF THE INVENTION

Figure 1:
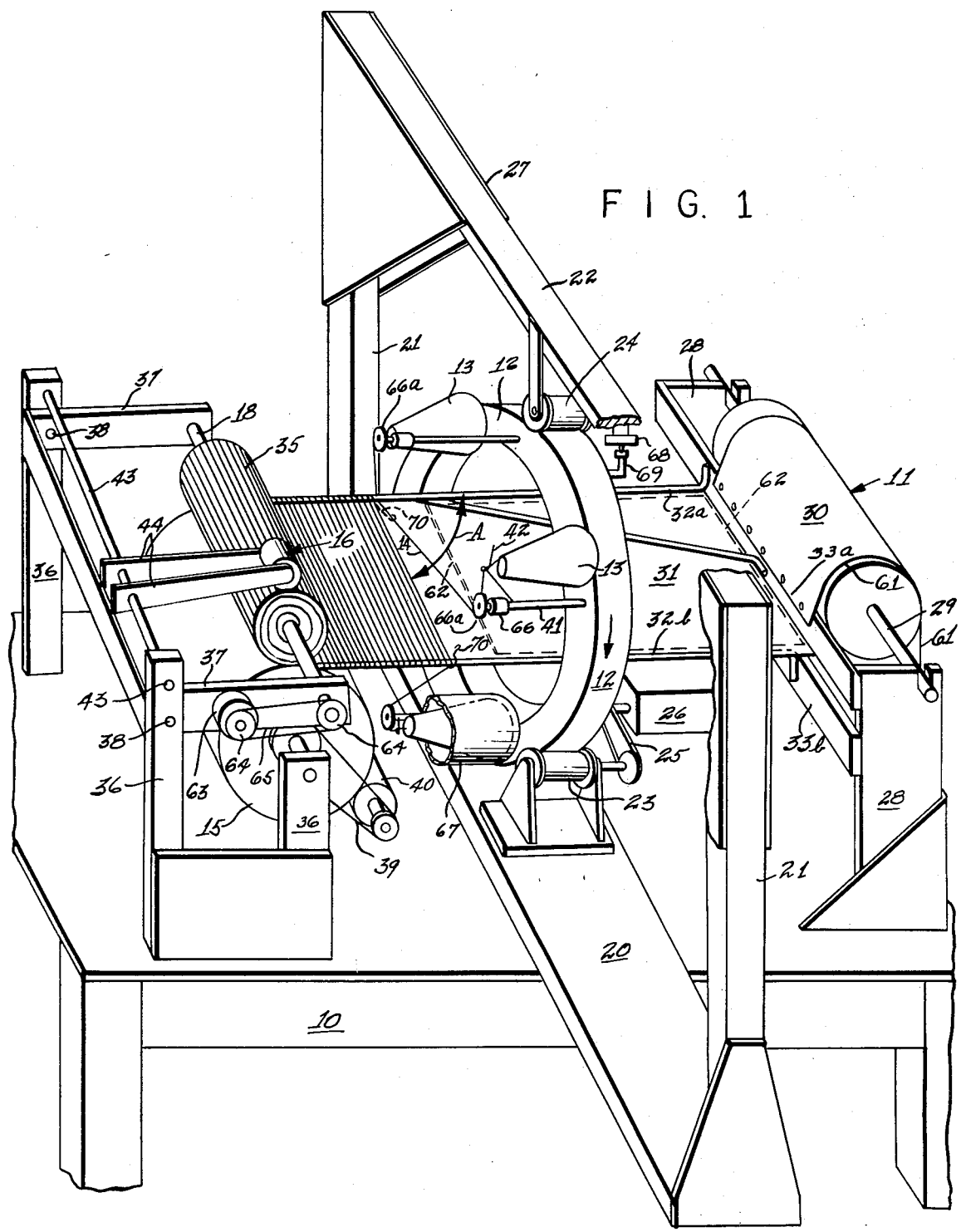
FIG. 1 is an isometric view of an apparatus for making a preferred permeation separatory element of this invention.

As stated above, permeation separation devices of the prior art have generally required that hollow filaments be packed tightly into a jacket with means for introducing a fluid feed such as brackish or saline waters at a point near one end of the filament bundle under pressure. In such instances water passes through the walls of the hollow filaments more rapidly than dissolved impurities and purified water is obtained from the open ends of the filaments while the remaining solution, enriched in impurities is withdrawn from the devices through exit ports.

In such devices the ideal flow of the fluid feed is that which permits for the greatest contact between fluid feed and filament surface. In practice however, considerably less than ideal conditions prevail. The flow of the fluid feed has a persistent tendency to cause the filaments to migrate and nest slightly together in compact bundles. This greatly reduces the filament surface available to the feed fluid as the bundles are practically impenetrable and the result is marked decrease in the efficiency of the permeator device.

These difficulties are largely overcome by this invention by inserting between layers of the hollow filaments one or more layers of foraminous web-like material which both separate and stabilize the position of the hollow filaments but do not materially restrict the flow of fluid feed.

Hollow Filaments

Hollow filaments suitable for use in this invention are those which under operating conditions are self-supporting with a reasonable flux. Thus, the filament wall thickness must be small enough to permit a practical flow of permeate through the wall and large enough to give a thickness to diameter ratio characteristic of self-supporting filaments. Generally speaking they have outside diameters of about 10 to 750 microns and preferably 15 to 300 microns. Their wall thickness is about 2 to 250 microns and preferably 5 to 90 microns. In general, the filaments with smaller outside diameters should have thinner walls so that the ratio of cross-sectional area of the internal bore of the filament to the total cross-sectional area within the outer perimeter of the filament is between about 0.12:1 and 0.75:1. Preferably, this ratio is between about 0.18:1 and 0.45:1.

Suitable hollow filament membranes can be different structures prepared by appropriate techniques and particularly adapted for particular separation processes as is known in the art. They can be hollow polymeric fibers prepared by melt spinning as described in the art, as for example by Breen et al. in U.S. Pat. No. 2,999,296. Such hollow filaments can be extracted or otherwise treated chemically or physically to improve their membrane properties as described for example by Mahon in U.S. Pat. No. 3,423,491 and by Cescon et al. in U.S. Pat. No. 3,551,331. Other hollow filament membranes particularly suited for use in the elements and devices of this invention are prepared by solution spinning as described by Richter et al. in U.S. Pat. No. 3,567,632.

The composition of the hollow filaments will depend largely upon the fluid composition to be separated and include polyethylene terephthalate, polyvinyl chloride, polyvinylidene chloride, polyhexamethylene adipamide, copolymers of tetrafluoroethylene and hexafluoropropylene, cellulose acetate, ethyl cellulose, polystyrene, copolymers of butadiene and styrene, cellulose esters, cellulose ethers, acrylonitriles, polyvinyl formals and butyrals, polyolefins, polyurethanes, polyamides and the like.

The filament layers can, theoretically at least, be a single filament thick, with all filaments in a given layer in substantially parallel alignment. In such a structure the filaments would be spaced sufficiently far apart to permit flow of the fluid mixture to be separated, but not so far apart as to result in an uneconomically small membrane surface area per unit volume, and not so close together as to reduce the efficiency of contact between the fluid mixture and the filament surfaces. The openings between the filaments in such an array would therefore have widths ranging between a minimum of a fraction of a micron and a maximum of no more than three times the diameter of the individual filaments.

In practice, however, the filament layers are conveniently and effectively more than a single filament thick. They therefore contain filaments which to some degree cross and contact other filaments at distances along their lengths which are substantial compared to their diameters, thereby forming passages through which can flow the fluid mixture to be separated. For example, the filament layers are conveniently formed of multifilament yarns such as are produced by multifilament spinnerets. After handling, such yarns are seldom completely free of twist or entanglement, so the filaments within such yarns are in substantially but not completely parallel alignment. They also tend to form flattened ribbons rather than round arrays when wound under tension or when compressed, so the filaments in yarns wound or laid side-by-side are also in substantially but not completely parallel alignment.

Thus, on a practical basis, the filament layers in the permeation separatory elements of this invention can be arrays of one to about 25 multifilament yarns in overlapping but substantially parallel alignment. The maximum useful thickness of such arrays in these elements depends upon the flexibility and other properties of the filaments and their array which determine the ease with which the filaments undergo movement toward the undesirable nested arrangements during use of the elements in separation processes. Arrays up to about 0.25 inch thick of hollow filaments having properties typical of textile fibers are useful in practice. Preferably the filament layers in the elements of this invention are made up of multifilament yarns containing 50 to 250 filaments and have an effective thickness ranging from about 5 to about 100 times the diameter of the filaments. In these preferred embodiments, the filaments and yarns are in substantially parallel arrangement, in which the filaments cross contact other filaments at substantial distances compared to the diameters of the filaments, and the openings between the filaments have smallest dimensions which predominately range from a few microns to no more than three times the outside diameter of the individual filaments.

Foraminous Material

As described, the separatory elements of this invention include separating layers between layers of hollow filament membranes. These foraminous separatory materials restrict movement and nesting of the adjacent hollow filaments by preventing their contact and by reducing their freedom of movement perpendicular to their length. The foraminous materials impart friction between the filaments and the materials and are resistant to such distortions as wrinkling and tearing. Preferably the foraminous material has uneven surfaces so as to touch only a small fraction of the adjacent filament surfaces and thereby to reduce only insignificantly the effective membrane area. In addition, the movement and nesting of filaments within a given filament layer, which further removes the filaments from a separating material, can be restricted by compression of the filament layer. The compression is caused by the foraminous separating material and the resulting increased friction between filaments which cross within the layer.

The foraminous separating materials must be thin so that they do not excessively reduce the fraction of the volume of the separatory elements which is available for the hollow filament membranes and correspondingly the membrane area which can be achieved in a given volume. They can range in thickness between the diameter of a single filament and about 20 mils. Preferably they are between about 2 mils and about 20 mils in effective thickness. Such thin foraminous materials are also desirably flexible and can conform to the shapes of the hollow filament layers and to the textures of their surfaces.

These separating materials must be foraminous in order to permit flow of the fluid feed mixture through the permeation separatory elements. The perforations, pores, or other openings whereby the structure is foraminous are preferably substantially uniform in size, and in distribution over the surfaces of the foraminous material. The distances between these openings are preferably sufficiently small that contact between adjacent filaments and the surfaces of the material does not significantly reduce the membrane area available for the permeation separatory processes. In such materials the openings represent a large fraction of the surface area and the surface is inherently uneven.

The size of the openings in the foraminous separating materials can vary widely. In general, the openings in a separating material should be no smaller than the openings between the filaments in the adjacent filament layers to avoid having the separatory material become a filter and being blinded by any particulate matter which may be carried by the fluid being separated. At the other extreme, the openings should not be so large as to permit movement together and nesting of filaments on the opposite sides of the separating material. Thus, the openings can be between about 1 micron and 0.25 inch in effective transverse dimension, that is in the dimension parallel to the axial direction of the hollow filaments. Preferably the openings, whatever their shape, range between about 5 microns (0.2 mils) and about 100 mils (0.1 inch) in largest transverse dimension.

Foraminous material suitable for use in the separatory elements of this invention can be any material which is compatible with the fluid mixture to be separated and with the materials of which the hollow filament membranes are made. Thus, suitable materials include metallic and non-metallic materials, and any non-metallic material can be of natural or synthetic origin. Synthetic polymeric materials are preferred because of their low cost and ease of fabrication into suitable shapes and forms.

These foraminous materials can be of any form within the general principles already outlined. Thus they can be porous flexible solids such as sintered metals or porous plastic sheets; pervious fibrous materials such as paper, cloth, or non-woven cloth-like materials; perforated films; or any other similar material. The structures should preferably have appreciable tensile strength in one direction to resist forces applied during fabrication of a permeator assembly but need not have appreciable tensile strength in a direction at right angles to the first direction. The preferred materials are in general web-like, in that they are flexible structures of relatively large area compared to their thickness, composed of fibrous elements, and with the general properties of cloth and paper. Particularly preferred structures include the "spunbonded" structures described by Shealy et al. in the Textile Research Journal, Volume 35, pages 322 to 329 (1965) and Volume 38, pages 7 to 15 (1968).

Representative of suitable materials for use as foraminous separating materials are those listed below in Table I.

TABLE I

| Composition and Construction | Aperture | Basis Weight oz/sq yd | Thickness mils |
| --- | --- | --- | --- |
| Polyethylene spunbonded sheet | 10 microns* | 2.2 | 8 |
| Polypropylene spunbonded sheet | 300 microns* | 2.5 | 10 |
| Nylon knitted tulle cloth | 20×20 per in. hexagonal | — | 5 |
| Nylon knitted tulle cloth | 9×9 per in. hexagonal | — | 9 |
| Nylon knitted tulle cloth | 27×27 per in. square | — | 5 |
| Nylon woven cheese cloth | 32×32 per in. | 1.5 | — |
| Nylon woven tobacco cloth | 20× 20 per in. | 1.0 | — |
| Nylon nonwoven cross-laid skrim | 10×10 per in. | 0.5 | — |

* Approximate maximum pore size.

Tube Sheet Structure

The permeation separation element of this invention also comprises a resinous tube sheet structure through which ends of the hollow filament membranes extend. This structure can be formed, for example, by placing the extremes of the hollow filament membranes and optionally the associated foraminous separating material in a mold and "potting" with a setting resin, as described by Mahon in U.S. Pat. No. 3,228,877 or as described by Maxwell et al. in U.S. Pat. No. 3,339,341, or by impregnating the alternating layers of hollow filament membranes and foraminous material with a setting resin, using techniques similar to those described by McLain in U.S. Pat. No. 3,422,008 or by Strand in U.S. Pat. No 3,342,729. A suitable setting resin which provides good strength is a mixture of an epoxy polymer modified with butyl glycidyl ether, a modified aliphatic amine adduct, and triphenyl phosphite. After solidification of the resin, the cast tube sheet structure can be sliced or cut if necessary to open the ends of the hollow filaments for flow therefrom of materials permeating through the membranes or to permit entry into the hollow filaments of a fluid mixture to be separated.

Utility

The permeation separatory elements described herein can be used for the separation of components from fluid mixtures, whether they be liquid, vapor, gas, or a combination of these. Suitable processes include any of the separation processes commonly known, for example, as selective permeation mass diffusion, gaseous diffusion, molecular effusion, dialysis, plezodialysis, thermodialysis, osmosis, reverse osmosis, thermoosmosis, ultrafiltration, and hyperfiltration. In particular, they are suitable for use in removing a wide variety of materials from liquid and aqueous mixtures. Typical components which can be separated from liquid mixtures containing water using these hollow filament membrane separation elements include inorganic salts containing anions such as sulfate, phosphate, fluoride, bromide, chloride, nitrate, chromate, borate, carbonate, bicarbonate and thiosulfate, and cations such sodium potassium, magnesium, calcium, ferrous, ferric, manganous and cupric; and organic materials such as glucose, phenols, sulfonated aromatics, lignin, alcohols and dyes. Specific applications for these elements include the purification of saline, brackish, and waste waters; recovery of minerals from sea water; for water softening; as artificial kidneys; and for the concentration of alkaloids, glucosides, serums, hormones, vitamins, amino acids, proteins, organometallic compounds, sugar solutions, milk, and extracts of coffee and tea, as well as many other solutions.

Fabrication

The permeation separation elements of this invention can be assembled either by machine or by hand. For example, a layer of yarns of continuous hollow filament membranes can be placed by hand in substantially parallel alignment on a sheet of cloth and the whole covered with another sheet of cloth. Formation of a resinous tube sheet structure and cutting the hollow filament membranes, if necessary to open them for fluid flow, completes the assembly of the separation element. The hollow filament membranes can, for instance, be in the form of cut lengths of filaments, hairpin-shaped segments, elongated loops, or continuous filaments in zigzag array. Two elements can be assembled at the same time by forming a number of elongated bundles of endless loops of hollow filament membranes by procedures outlined by Maxwell et al. in U.S. Pat. No. 3,349,341, spreading these bundles in substantially parallel alignment between layers of cloth, forming a tube sheet structure as described by McLain in U.S. Pat. No. 3,422,008 between the ends of the elongated bundles, and cutting through the tube sheet structure to open the filaments in the two-part bundle assemblies for fluid flow.

In a variation of the above-described procedures, continuous hollow filament membranes can be wound around a web-like separating material to obtain unitary layers of filaments on both sides of the material. Two or more of the resulting assemblies can be associated and provided with a tube sheet structure to make a permeation separation element as defined herein. Such an element can have between each pair of foraminous separating layers two or more layers of hollow filament membranes. Separate unitary layers will be formed, for example, when filaments are wound around the web-like separating material at a slight spiral angle (5° or less) so that the filaments on the two sides of the separating material have slightly different angles toward a common direction, for instance an edge of the material around which the filaments make a hairpin turn. Two such assemblies can be stacked in such a way that the filaments in the surfacss of the two layers cross each other at a small angle and the filaments are therefore in substantial but not completely parallel alignment. Obviously larger spiral angles can be used but are less efficient. A particular apparatus and procedure for assembling such structures and permeation separation elements containing them are described below in greater detail.

The alternate layers of hollow filament membranes and foraminous separating material of the permeation separation elements of this invention can have configurations other than planar. For example, they can be pleated or cylindrical in configuration in devices which include means for passing a fluid to be separated through the structure across the hollow filament membranes. In a preferred configuration, the alternate layers of hollow filament membranes and separating materials are convolutely wound around a central space which provides a passageway for introduction or removal of the fluid to be separated and assures flow of this fluid radially through the convolutely wound structure.

These and other embodiments of this invention can be better understood by reference to the drawings. In a particularly preferred configuration the alternate layers of hollow filament membranes and separating materials are convolutely wound around a central foraminous tube which supports the inner layers of the convolute winding. Such an assembly with an associated tube sheet structure in a separation element of this invention is shown in schematic cross-section in FIG. 9 in which the cured resin tube sheet 19 contains successive layers of hollow filament membranes 14, the edge of convolutely wound web separating material 31, and the foraminous hollow tube 18. In this embodiment, part of the resinous tube sheet 19 and part of the tube 18 has been counterbored, closed with plug 50, and potted with fresh resin 19 to close off one end of the tube. The opposite end of the tube 18 is joined to a nonpervious tubular conduit 51 which is adapted to introduce into or remove from the foraminous tube 18 the fluid mixture to be separated. The opposite portions of the filaments 14 in this embodiment form hairpin bends 52 which generally extend around the folded edge portions of the webs 31 and then extend through the annulus formed on the opposite side of the web 31 and through the cured resin tube sheet 19 from which they emerge, so that the interiors of both ends of the hollow filament membranes are open for fluid flow.

Figure 10:
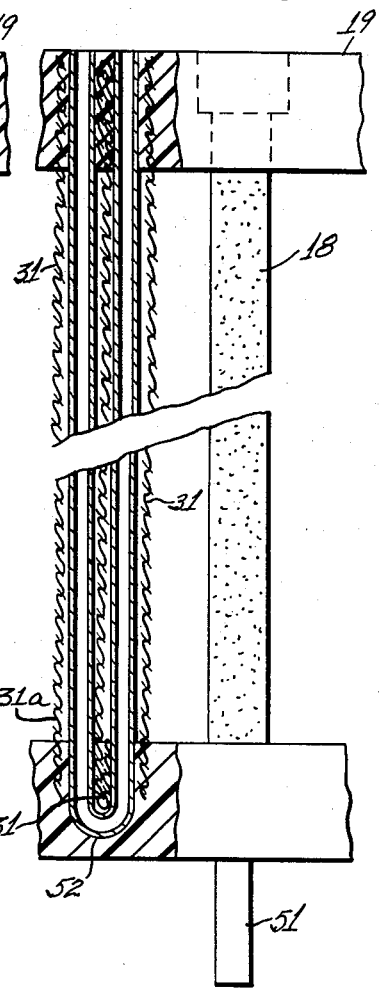
FIG. 10 is a partial longitudinal cross-section of a separatory element similar to that shown in FIG. 9 but having a solid resin structure at both ends.
Figure 11:
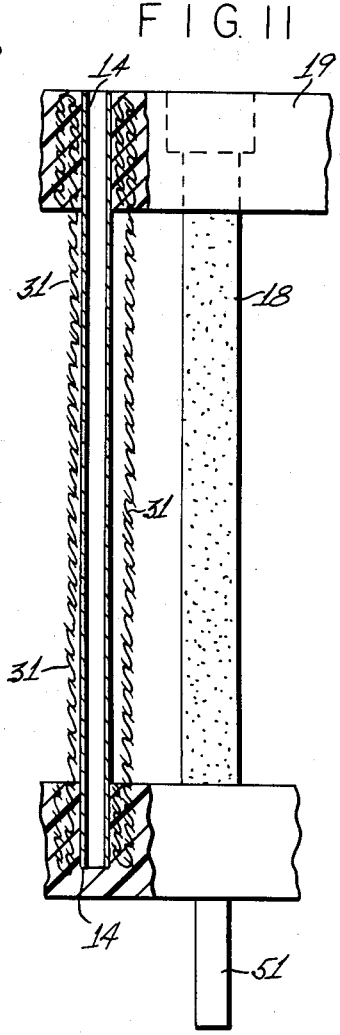
FIG. 11 is a cross-section similar to that shown in FIG. 10 but with the hollow filaments severed at both ends, and closed at one end with a solid resin structure.

FIGS. 10 and 11 also show schematic partial cross-sections of permeation separation elements of this invention in which alternate layers of hollow filament membranes and separating web-like material are convolutely wound around a central foraminous tube. The central tube in such an element is substantially larger in diameter than the hollow filaments and can be of any practical small diameter, like 0.25 inch to 1.0 inch in diameter in assemblies a few inches in diameter or larger in larger assemblies. The foramina are evenly spaced along the portion of the tube within the convolute winding in order to promote flow of the fluid to be separated equally across all portions of the assembly. The foramina can be small enough and of such a number that the tube offers greater resistance to fluid flow than the surrounding structure so that, with fluid flow from the structure towards the tube, the tube tends to equalize flow through all equivalent portions of the structure. The foraminous tube can be made of any material resistant to the fluid to be separated, such as an inert plastic, resin reinforced fiberglass, ceramic, or metal. In permeation separation devices for use in aqueous systems a particularly preferred material for such foraminous tubes is porous high-density polyethylene in which the pores are 5 to 100 microns in effective diameter.

Figure 9:
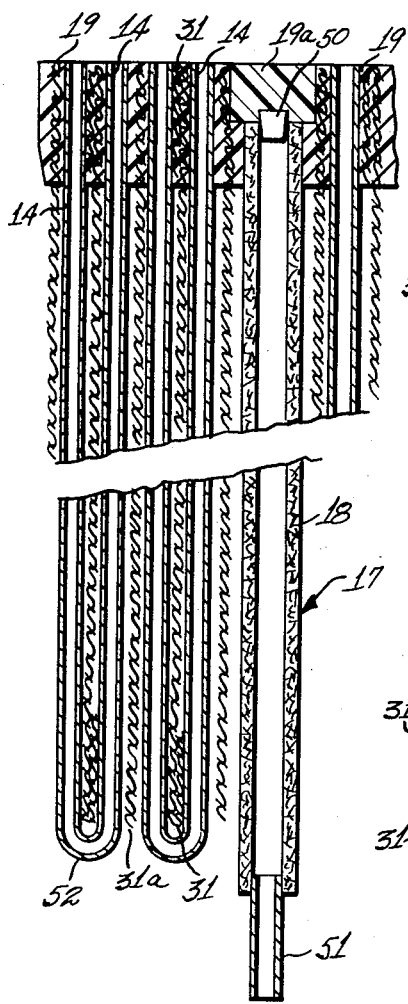
FIG. 9 is a schematic partial longitudinal cross-section of a permeation separatory element of this invention showing a foraminous tube in the center and a solid resin structure at one end only.

In FIG. 10, the upper tube sheet end is identical to that of FIG. 9. However, at the lower end, the filament bends 52 as well as the fold edges of the foraminous web 31 are potted in resin to impart somewhat more stability to the structure. As can be seen the lower face of the resin is not machined, and the filaments are neither cut nor exposed. In FIG. 11 the lower end is again potted, except here the filaments 14 are severed prior to encapsulation with resin. Thus, the terminal ends of the filaments lie within the confines of the resin and the hollow interiors of the filaments are sealed off.

Figure 12:
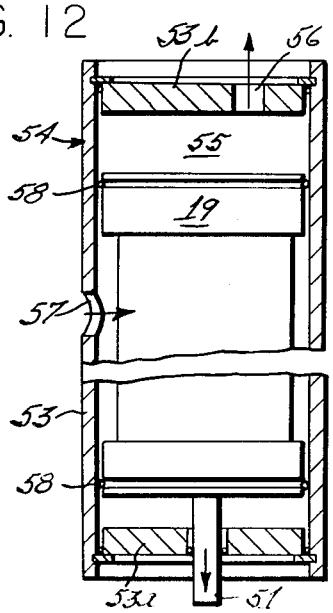
FIG. 12 is a diagrammatic longitudinal cross-section of a selective permeation device of this invention.

Any of the convolutely wound permeation separation element embodiments described herein are suited for use in the permeation separation device of this invention shown diagrammatically in FIG. 12, which generally comprises a shell 53, usually tubular in form, closed at each end by heads 53a and 53b, respectively. The heads may be secured to the shell 53 in any conventional fashion, such as by welding, by snap rings (shown), or by bolting, sealing being affected by means of flat gaskets or elastomeric "O"-rings or the like. The convolute wound structure is installed in the shell 53 with a sealing means, such as an "O"-ring 58, between the cured resin 19 and the shell 53. The nonpervious conduit 51 of the structure extends through a suitable aperture in the head 53a and is sealed relative thereto. An aperture 57 in the shell 53 serves to admit feed fluid while reject fluid emerges from the conduit 51. Product or permeate flows through the interior of the hollow filaments 14 and thence to the head space 55 where it is collected, emerging from the apparatus via aperture 56. In this embodiment it will be seen that the feed fluid entering aperture 57 flows generally radially inward through successive layers of the convolute wound web 31 and amongst the generally parallel filaments 14.

Figure 13:
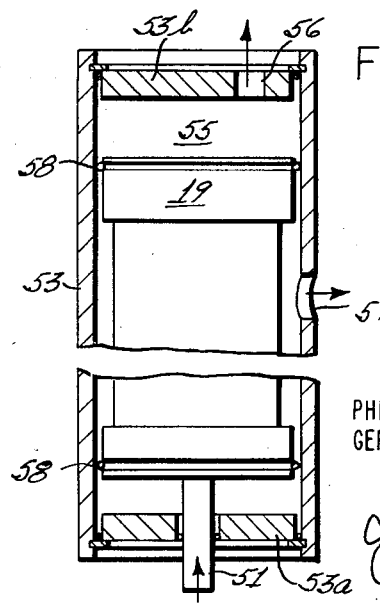
FIG. 13 is a diagrammatic longitudinal cross-section of a permeation apparatus similar to that of FIG. 12 but with different directions of fluid flow specified.

If reverse flow is desired, i.e., radially outward, the embodiment of FIG. 13 can be used which is structurally identical to FIG. 12. However, in FIG. 13 feed fluid enters the conduit 51, flows through and generally radially out of the hollow foraminous tube 18, and thence among the filaments and through the webs to emerge from the vessel at the aperture 57. Permeate product flows through the filaments to the head space 55, as before, being recovered at the aperture 56.

The shell of the devices may be made with any suitable transverse cross-sectional configuration and of any suitable compatible material of sufficient strength. Cylindrical metalic housings, for example, steel pipe, are satisfactory, being reasonably easy to produce and assemble. The size of the tubular jacket may vary from less than 1 inch to many inches in diameter, such as 10 or 14 inches, and may vary from about 1 to many feet in length, e.g., 10 or 14 feet.

Methods by which the permeation separation elements of this invention are fabricated can be better understood by reference to the drawings wherein FIG. 1 is an apparatus for making preferred permeator devices of this invention which generally comprises a frame 10, a web feeder 11, a wheel 12 carrying wound packages 13 of hollow filaments 14, a drive roll 15, a resin applicator 16 and a partially completed permeator 35 all of which will be described in greater detail.

Figure 3:
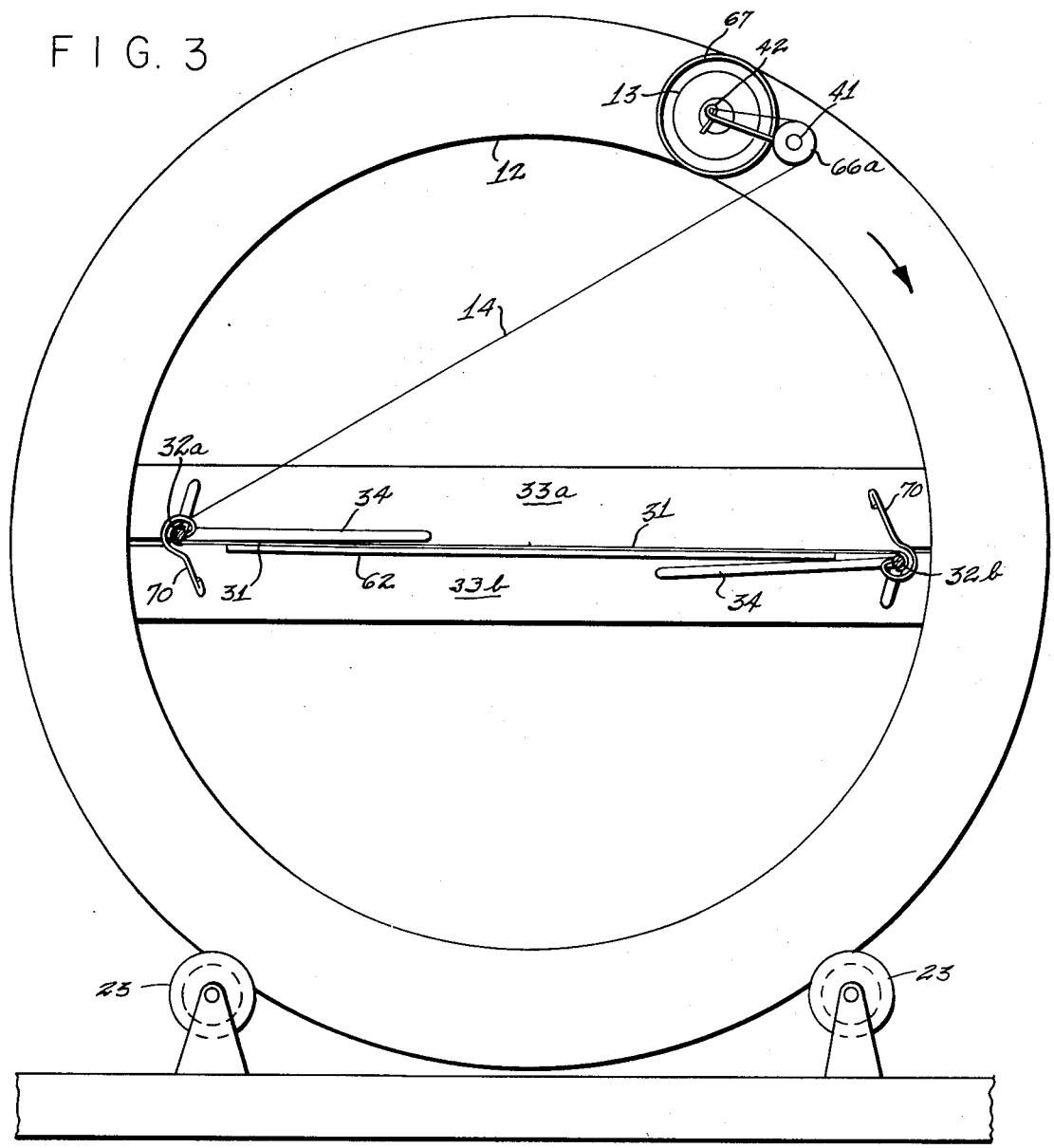
FIG. 3 is an elevational view showing the web guide and wheel of FIG. 1.

The machine frame 10 supports the entire apparatus on a generally horizontal surface extending across which is a beam 20 which carries a pair of posts 21 which carry another horizontal beam 22 thus forming an open frame 27 which surrounds the wheel 12; the latter is supported by a pair of flanged rollers 23 which are carried to bearings mounted on the beam 20 as shown in FIGS. 1 and 3. A similar roller 24 is mounted on the lower side of the beam 22 and engages the top of the wheel 12. One of the two lower rollers 23 is power driven by a chain 25 and a motor 26 the speed of which may be varied by means not shown thus making it possible to drive the wheel 12 and to vary its speed.

Figure 7:
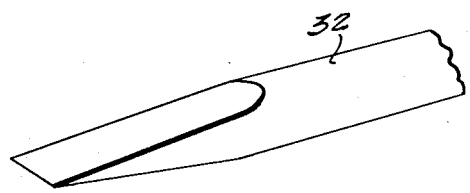
FIG. 7 is a fragmentary isometric view of a web guide showing a chisel shaped end.

Beyond the right side of the frame 27 and the wheel 12 is the web feeder 11 which comprises a pair of posts 28 which support a rotatable arbor 29 which, in turn, supports a convolute wound roll 30 of web-form material described above. The roll 30 is rotatable clockwise as viewed in FIG. 1 to pay off web 31 horizontally in a plane which passes through the center of rotation of the wheel 12. Rotation of the roll 30 is resisted by a fabric strap 61 wrapped around roll 30 and substantially coextensive with the width of that roll. One end of the strap 61 is anchored to the top of the beam 33a and the opposite end, hanging downward carries a weight 60. (See FIG. 2). The web is guided by means of a pair of fixed, cantilevered bars 32a, 32b shown best in FIG. 2. These are supported by means of a pair of horizontal beams 33a, 33b which are secured at each end to the posts 28 being spaced, respectively, slightly above and slightly below the horozontal web 31 thus holding the bars 32a and 32b above and below the web, respectively. The bars each have diagonal braces 34 as shown in FIG. 3 to prevent them from being pulled horizontally toward the center of the web. The bars 32a, 32b extend completely through the center aperture of the wheel 12 and at their free ends are chisel-shaped as shown in FIG. 7. These ends lie in close proximity to the outer surface of the drive roll 15. Extending generally between the bars 32 is a horizontal, planar table 62, seen best in FIG. 3, which supports the central part of the web 31. The drive roll 15 is journalled in bearings not shown in posts 36 which stand on the machine frame 10. These posts also support a pair of swing arms 37 on pivots 38 which arms carry a rotatable arbor which comprises a foraminous hollow tube 18 and a drive comprising a torque motor 63, pulleys 64 and belt 65, the tube 18 being adapted to receive a convolutely wound structure 35 as shown. The drive roll 15 is power driven by means of a chain 39 and a variable speed motor 40.

The web 31 has a transverse width a few inches greater than the width across the outer surfaces of the cantilevered bars 32. Thus, as the web 31 is paid off the roll 30, the two edges of the web are caused to wrap for about 180° around each outer peripheral surface of the bars 32 as seen best in FIG. 3; the purpose for this will be discussed further below.

Figure 3A:
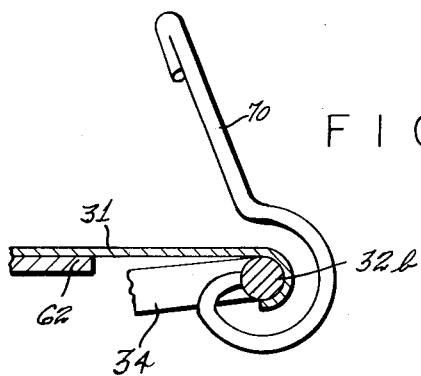
FIG. 3A is an enlarged view of the filament guide of FIG. 3.

Situated on one face of the wheel 12 are wound packages 13 of hollow filaments 14 obtained from conventional fiber spinning operations such as described in U.S. Pat. No. 3,442,002. The cores of the packages are preferably nonrotatably supported inside open-ended cannisters 67 on suitable pins or chucks not shown which are carried by the wheel 12. A post 41 stands next to each package 13, being supported by the wheel 12, and carries a yarn guide 42 spaced from the end of the packages which permits over-end removal of the filaments 14 when tension is applied thereto. A single package 13 or a plurality of packages may be used depending on the desired rate of utilization or laydown of filaments. On each post 41 is a magnetic hysteresis type brake 66 for exerting a preselected level of tension in the filaments as they advance around the pulley 66a on the brake 66. Fixed filament guides 70 made of round wire are used on the bars 32 as shown in FIGS. 1, 3 and 4. As shown in FIG. 3, and the enlarged section FIG. 3A, the foot of the guide 70 is anchored to the inner face of each bar 32, clear of the edge of the web 31. The remainder of the guide encircles the bar 32 for about 270°, then extends inward and upward in a generally straight line, the latter being inclined backward, i.e., toward the roll 30, by about 30° to the vertical, as seen in FIG. 4. The left edge of the portion of the guide 70 that encircles the bar 32 is located slightly to the left of the plane 71 swept by the filaments 14 as they depart from the pulley 66a of the brake 66. Thus, the guide 70 is adapted to cam the filaments to a known position on the bars 32 and the web 31.

Extending transversely between the left part of the posts 36 is a horizontal beam 43 which supports a resin applicator 16 comprising pivotally mounted swing arms 44 which carry a short, e.g., 2 to 4 inch roller 45 and a doctor blade 46. (see FIG. 4) The lower edge of the doctor blade is spaced from the perimeter of the roller 45, and the blade 46 and the roller form a vee-trough which carries a supply of viscous adhesive material 47, such as uncured epoxy resin. The roller rests initially on the bare tube 18 and later on th surface of a convolute wound structure to be rotated thereby, being thus adapted to carry a "metered" quantity of adhesive 47 counterclockwise around the perimeter of the roller 45 to be deposited on the structure 35 below.

Initially the web 31 is withdrawn from the roll 30 by hand in planar form, is strung between the beams 33, through the interior of the wheel 12 and the table 62 and across the guide bars 32 where the two edges of the web are wrapped partially about each of the guide bars, as shown in FIG. 3, but not less than about 180° on each. The web is manually advanced toward the bare tube 18 and as it departs from the chisel-shaped terminal ends of the guide bars 32 is folded upon itself, as shown in FIG. 5, being retained in the folded form by the weight of the tube 18 pinching it against the drive roll 15. The leading edge of the folded web is wrapped about the tube 18 a little in excess of one full turn so as to entrap it and secure it thereto. The web is maintained taut in the machine direction by means of the weight 60 and strap 61. If it is desired to avoid a double thickness of material, as an alternative, the web 31 may be folded upon itself, as described, but in addition may be slit continuously at the site of the crease by means of a fixed circular blade 48 situated with its cutting edge very close to the nip between the tube 18, or the convolute wound structure, and the surface of the drive roll 15. An additional advantage in this is that the adhesive present at the edge of the web 31 and received from applicator 16 may tend to bleed through the web and be deposited on the drive rolls. However, if selvage 49 underlies the web 31 at this point, the bleed-through will be received by the selvage and subsequently discarded as shown generally in FIG. 6, the selvage 49 being drawn axially away from the drive roll by a puller not shown. The blade 48 may be supported and rotated on a substantially vertical axis by means not shown.

Filaments 14 are deposited by securing their leading ends to the web, e.g., by adhesive, and then by rotating the wheel 12, thus withdrawing them from the packages 13 around the pulley of the brakes 66. The filaments are laid on the web 31 transversely in a kind of helical path since the web is being advanced at a constant velocity by means of the drive rolls 15 aided by the torque motor 63. The filaments may be laid side by side or in spaced or even in overlapping relationship depending upon the preselected relative velocity of the wheel 12 and the web 31.

The filaments extend around the curving edge portion of the web which overlies the bars 32 for 180°, thus they are substantially out of contact with these bars from which it will be seen that slippage of the filaments lengthwise along the bars 32 and concomitant damage from this source is avoided altogether. Since the web 31 is wrapped in a kind of "S" form about the bars 32 (FIG. 3) and since the filaments are being subjected to a slight tensioning effect due to the use of the brakes 66 which tension is exerted in the direction in which the "tails" of the "S" point, it will be seen that the web edges will each tend to be urged clockwise around the respective bars 32 thus making the web 31 taut in the transverse direction in the expanse between the bars and thus maintaining it in a planar condition.

From the foregoing it will be seen that the filament 14 is laid on the top and bottom of the web 31 as a kind of conveyor belt; the filaments and the web progress into the nip between the hollow foraminous tube 18 or the nip between the convolutely wound structure and the perimeter of the drive roll 15 at which nip they become trapped, forming the successive layers of the convolutely wound structure being secured or encapsulated at one or more sites by adhesive resin being deposited by means of applicators 16. The resin is supplied over a limited length such as 2 to 4 inches, and at such a rate as to completely penetrate and fill the interstices between filaments 14 over that length. Similarly the spaces between the filaments and the web 31 and the apertures within the foraminous web are filled in effect forming a "solid" structure, when the resin has cured, save for the spaces inside the hollow filaments which, of course, are not penetrated by the resin.

When the wound structure reaches a desired size, it is removed from the apparatus after which the resin is permitted to cure. Next, the convolutely wound structure, the resin, and all of the potted materials are machined so as to cut and expose the hollow interior portions of the filaments, forming a tube and a tube sheet structure as shown in cross section in FIG. 9.

As described above, filaments 14 are laid transversely on the web 31 by means of the rotating wheel 12.

Figure 6:
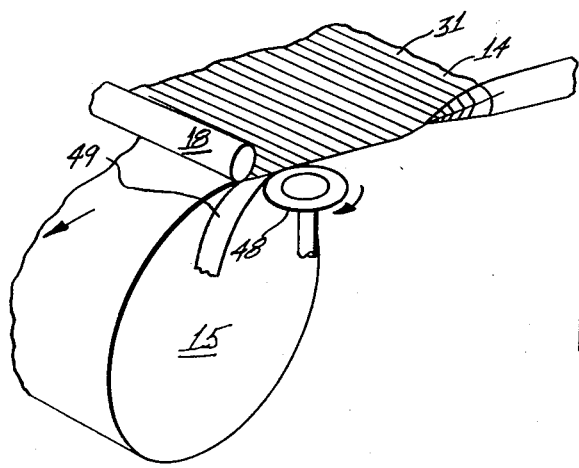
FIG. 6 is a fragmentary isometric view of a winder showing a slitter blade used for removal of a portion of the web.
Figure 8:
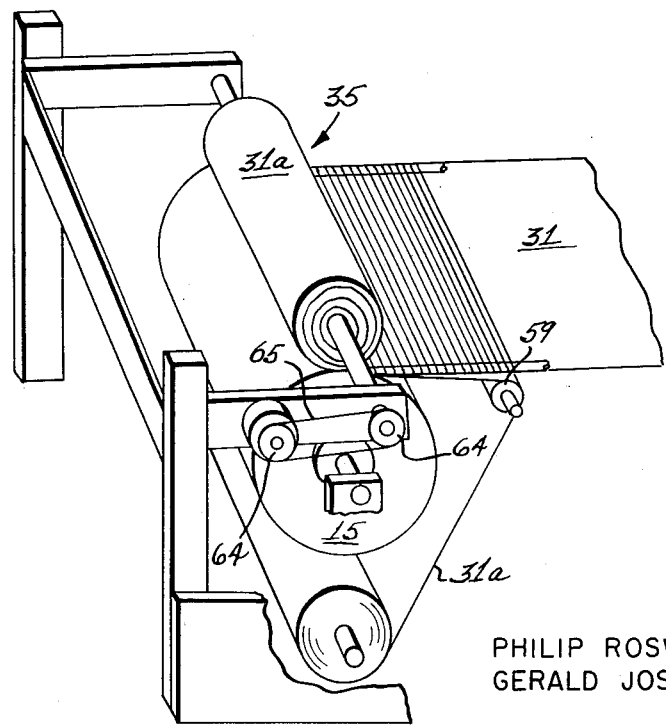
FIG. 8 is an isometric view of a portion of an apparatus similar to that shown in FIG. 1 but with means for feeding and winding an additional layer of web-like material.

However, because the web is moving, the lay of the filaments is not precisely at 90° but it is at an angle, the magnitude of which is contingent on web speed compared to wheel speed. With constant web speed, as the wheel speed is decreased, the angle A shown in FIG. 1 will become smaller with the effect that filaments on the top and bottom of the web 31 have opposite lay at a small angle such as 2° to 5° or more relative to each other. The result is that the filaments in contiguous layers in wound structure 35 will cross each other at about the same angle. While this is not necessarily of major importance, the filament crossovers could cause injury to filaments particularly if a tightly wound structure 35 is desired. This can be avoided by use of the apparatus of FIG. 8 in which an additional web 31a is introduced near the drive roll, passes around an idler or guide roll 59 beneath the web 11 and the lower run of filaments and is subsequently caught in the nip between the drive roll 15 and the lower run of filaments. Thus, in the convolute wound structure 35 the second web 31a will be seen to lie between successively wound layers of upper and lower filaments, thereby separating them from each other. The use of an additional web 31a also serves to support the lower run of filaments as they approach the nip in the winding operation in the event that they tend to sag or in the event that the folded edge of the web 31 and the filaments 14 are slit as shown in FIG. 6 and described above.

It will be realized that if a different rate of laydown of filaments is desired without removing or adding package 13 to the wheel 12, the rate of laydown can be altered simply by changing the wheel speed with a constant web speed. For example, it may be desired to have a greater density of filaments in the outer portion of the wound structure 35 in which case the wheel speed can be increased as the structure is prepared.

If desired, a revolution counter 68 can be mounted on the beam 22, or other convenient places, to be actuated by a cam 69 on the wheel 12. Thus, the total number of revolutions of the wheel 12 can be observed as a measure of the total number of filaments emplaced in a given permeator assembly. For convenience the counter can be manually resettable to zero.

The following examples illustrate this invention.

EXAMPLES

Example 1

A permeator separatory element was assembled using, as the foraminous web material, a 30 inch wide sheet of Style 3250 Typar spunbonded polypropylene non-woven fabric with a basis weight of 2.5 ounces per square yard and a thickness of 0.01 inch and used as the membranes were hollow filaments made of an aromatic polyamide containing sulfonic acid groups by procedures described by Richter et al. in U.S. Pat. No. 3,567,632. The filaments were in the form of 150 filament 3,000 denier yarns. The equipment of FIG. 1 was operated for 10 minutes at a web speed of 12 inches per minute, during which the hollow filament yarns from 12 bobbins were wrapped on the web at a wheel speed of 18 revolutions per minute. The resulting wrapped web was wound as it was made onto a 32 inch long "Por-X" porous polyethylene tube (made by Porex Materials Corporation) with an inside diameter of 0.4 inch, an outside diameter of 1.0 inch, and uniformly covered with pores of about 10 microns diameter. The porous tube was cut at one end of the wound assembly and plugged at this end. A restraining collar was placed around this end of the assembly and the end was covered with a viscous epoxy resin to encapsulate it. After the resin was hardened, the tube was cut at the other end within the wound assembly. A nonporous polyethylene tube was then sealed to the cut end, and that end was similarly encapsulated in an epoxy resin. The encapsulated end containing the plugged tube was cut through the web material to open the ends of the hollow filament membranes to fluid flow. The resulting separatory element was about 3.9 inches in outside diameter, contained about 600,000 filaments each with an effective length of about 25 inches and contained a total membrane area of about 1,300 square feet. When installed in a shell like that shown in FIG. 12, this element effectively desalts brackish waters under reverse osmosis conditions for a significantly longer time than a similar element without the layers of foraminous web material.

Example 2

Two other permeators were assembled as follows: Two pieces 30 inches wide and 11 feet long of nylon polyamide tulle cloth containing 20 hexagonal openings per inch and 5 mil threads, were laid parallel on the floor about 10 inches apart. Four parallel yarns of the type described in Example 1 were wound for about 25 turns onto a hank wheel as described in U.S. Pat. No. 3,339,341. An epoxy resin was applied to one region on the hank. The hank was removed from the wheel and stretched to form a bundle over 70 inches long with the epoxy resin near the mid-point. This bundle was laid across the two pieces of cloth, with the epoxy resin in the space between the two pieces, substantially perpendicular to the edges of the cloths. The yarns of the bundle were spread uniformly on the cloths to leave them in layers one to three yarns thick in substantially parallel array. Approximately 100 bundles of hollow filaments were likewise made and spread on the cloths to cover substantially the total area.

Two porous polyethylene tubes like those described in Example 1, each plugged at one end, were wrapped with five layers of cloth. The two cloths and their associated hollow filaments were rolled onto the cloth-covered polyethylene tubes, with the plugged ends of the tubes toward but not within the portions of the filaments containing epoxy resin and with the hollow filaments substantially parallel to the central tubes. The resulting convolutely would assembly was about 4 inches in diameter. The hollow filament membranes were cut in the epoxy-coated region, separating the assembly into two essentially equivalent portions. Restraining collars were placed around the two epoxy-coated ends of the bundles of hollow filaments, the open ends of the filaments were covered with additional epoxy resin, and the resin was hardened. The other ends of the bundles and part of the open ends of the porous polyethylene distributor were cut off. Nonporous polyethylene tubing was inserted into the distributor and restraining collars were placed around the hollow filaments and the nonporous tubing with the edges of the rolled cloth within the restraining collars. A viscous epoxy resin was applied to the ends of the filaments and allowed to harden. The epoxy resin at the end of each assembly containing the plugged end of the porous tube was cut to open the ends of the hollow filaments for fluid flow. The resulting permeation separatory elements each contained about 740,000 hollow filament membranes with an effective area of about 1,378 square feet.

These elements were wrapped between the epoxy tube sheets with a porous plastic netting and assembled into permeators of the type of FIG. 12. In reverse osmosis tests with one of these devices, water containing 1,500 parts per million of sodium chloride was introduced into the shell at a feed pressure of 400 pounds per square inch. There was obtained, at a yield of 50 percent, 1.61 gallons per minute (1.69 gallons per square foot per day) of water with a sodium chloride concentration 8.7 percent of that of the feed water, with a pressure drop of 7 pounds per square inch between the shell and the hollow foraminous tube. Later this permeator was fed a natural brackish water containing about 1,750 parts per million of total dissolved solids mainly as calcium, magnesium, and sodium chloride, phosphate, and bicarbonate. During over 1,400 hours of operation at a feed pressure of about 600 pounds per square inch, a permeated water yield of about 75 percent was obtained with the permeated water containing about 8 percent as much salt as the feed water. The permeate was obtained at a rate dropping gradually from 1.8 to 1.2 gallons per minute. During this period, the pressure between the shell entrance and the foraminous tube exit remained essentially constant at 15 pounds per square inch.

The embodiments of the invention in which an exclusive property or privilege is claimed are as follows:

1. An improved permeation separatory element comprising
    a multiplicity of hollow filaments of a polymeric material in at least two discrete thin layers, in substantially parallel alignment in a given layer, unattached to other filaments over their entire effective surface, each filament having an outside diameter between about 10 and 750 microns, a wall thickness between about 2 and 250 microns and an open end;
    a thin foraminous material separating the layers of filaments and detached therefrom over the entire effective surface of said filaments; and
    a resinous tube sheet structure of relatively short thickness in comparison with the length of the filaments, in a fluid-tight relationship with the filaments and substantially perpendicular to the filaments, each open end of the filaments extending through a tube sheet structure.

2. A permeation separatory element of claim 1 wherein there are two layers of hollow filaments between each layer of foraminous separatory material.

3. A permeation separatory element of claim 1 wherein the separated layers of hollow filaments and the foraminous separatory material are convolutely wound around a center.

4. A permeation separatory element of claim 3 wherein the center of the convolutely wound layers of hollow filaments and foraminous separatory material is occupied by a tube,
    substantially larger in diameter than the hollow filaments, and
    foraminous along the length of that portion of the tube within the convolutely wound layers.

5. A permeation separatory element of claim 4, surrounded by a vessel in fluid-tight relationship with a resinous tube sheet structure said vessel having separate conduit means to permit movement of a fluid between an area outside the vessel and
    an area adjoining the interior walls of the vessel,
    an area within the hollow tube, and
    an area adjacent to a face of a resinous tube sheet structure through which the ends of the hollow filaments extend,
    said conduit means being arranged to promote the movement of fluid in a path through the foraminous material and across the hollow filaments.

6. A permeation separatory element and vessel of claim 5 wherein
    the outer surface of the convolutely wound layers is spaced away from the inner surface of the vessel and
    the hollow tube is uniformly foraminous along its length which is within the convolutely wound layers.

7. A permeation separatory element and vessel of claim 5 wherein there are two layers of hollow filaments between each layer of foraminous separatory material.

* * * * *